US006247891B1

(12) United States Patent
Lind

(10) Patent No.: US 6,247,891 B1
(45) Date of Patent: Jun. 19, 2001

(54) APPARATUS FOR TRANSPORTING PIPETTE TIPS

(75) Inventor: Peter Lind, Yountville, CA (US)

(73) Assignee: Labcon, North America, San Rafael, CA (US)

(*) Notice: Subject to any disclaimer, the term of this patent is extended or adjusted under 35 U.S.C. 154(b) by 0 days.

(21) Appl. No.: 09/216,090

(22) Filed: Dec. 18, 1998

(51) Int. Cl.[7] ..................................................... B65G 47/90

(52) U.S. Cl. ........................... 414/811; 294/64.1; 294/65; 414/627; 414/416; 414/797; 414/752.1; 422/300; 269/21

(58) Field of Search .................... 294/64.1, 65; 414/797, 414/416, 627, 752.1, 811, 908, 910, 806; 269/21; 279/3; 422/300

(56) References Cited

U.S. PATENT DOCUMENTS 3,221,910 * 12/1965 Izumi .................................... 414/416
3,831,992 * 8/1974 Francois ................................ 294/65
4,461,328 7/1984 Kenney .................................. 141/67
4,468,974 9/1984 Malinoff ................................ 73/863
4,478,094 10/1984 Salomaa et al. ....................... 73/863
4,500,247 * 2/1985 McKnight et al. .................. 414/416
4,565,100 1/1986 Malinoff ................................. 73/863
4,604,024 * 8/1986 Edwards et al. .
4,852,620 8/1989 Jakubowicz et al. .................. 141/25
4,909,992 3/1990 Björkman ............................. 422/100
4,952,518 8/1990 Johnson et al. ...................... 436/518
5,063,790 11/1991 Freeman et al. ....................... 73/864
5,192,511 3/1993 Roach .................................. 422/100
5,293,179 * 3/1994 Ichikawa et al. ................ 414/416 X
5,334,352 8/1994 Johnson ................................ 422/99
5,343,909 9/1994 Goodman ............................. 141/242
5,392,914 2/1995 Lemieux et al. ..................... 206/499
5,497,670 3/1996 Carl ........................................ 73/863
5,736,105 4/1998 Astle .................................... 422/100
5,807,524 9/1998 Kelly et al. .......................... 422/100

* cited by examiner

*Primary Examiner*—Frank E. Werner
(74) *Attorney, Agent, or Firm*—Finley & Berg, LLP

(57) ABSTRACT

An apparatus for transporting pipette tips is provided which comprises a vacuum manifold and one or more air conduits. The vacuum manifold internally defines a vacuum chamber, and has a wall which defines one or more apertures. The vacuum manifold is adapted for use in conjunction with a vacuum source.

An air conduit is fixed to each of the one or more apertures defined by the wall of the vacuum manifold. Each air conduit defines an air channel, and is sized such that it can be inserted through a proximal opening defined by the head of one of the pipette tips without contacting the inner surface of the head of the pipette tip. The air channel of each air conduit is larger than a distal opening defined by the body of the pipette tip, such that when each air conduit is inserted through the proximal opening of one of the pipette tips and a vacuum source is used in conjunction with the vacuum manifold to create a vacuum in the vacuum chamber, the pipette tips are held in engagement with the vacuum manifold.

3 Claims, 7 Drawing Sheets

APPARATUS FOR TRANSPORTING PIPETTE TIPS

FIELD OF THE INVENTION

This invention relates generally to an apparatus which may be used to secure, release, and move one or more pipette tips between locations, and particularly to an apparatus which transports empty pipette tips using vacuum suction.

BACKGROUND OF THE INVENTION

Pipette tips are commonly used to transfer and dispense liquids, such as in scientific or medical testing. A typical pipette tip is made of plastic and formed with a substantially conical head and a frustoconical body. The head forms an opening at its proximal end while the body forms a smaller opening at its distal end. The pipette tip head has a larger outer diameter than the pipette tip body, and forms an annular lower edge at the junction of the head to the body. In use, the head of the pipette tip is typically force fit onto the shaft of another device, a pipettor, and held in place by friction. The pipettor is then operated to draw liquid into and expel liquid from the pipette tip through the distal opening in the tip body.

In most applications, pipette tips are used in large quantities, making individual handling of the pipette tips highly inconvenient. Consequently, a number of devices have been developed which manipulate numerous pipette tips at once for pickup or delivery of fluid. Typically, the pipette tip heads are inserted into a number of shafts on the device, with the positioning of the pipette tips and shafts chosen to be compatible with standard multi-well plates. The device positions the pipette tips into the wells of the plate, and liquid is drawn from the wells into the pipette tips, or liquid is expelled from the pipette tips into the wells. For compatibility between devices and plates, an industry standard has been developed for the spacing between the wells of the plates and for the spacing between the pipette tips when the pipette tips are mounted on the devices. Pipette tips are normally sold packaged in flats or racks which hold the tips in this desired spacing.

Those standard pipette tip racks and flats typically have a rectangular upper surface which defines an 8×12 array of 96 apertures, with approximately 9 millimeters separating the centers of each two adjacent apertures. Each aperture has a diameter larger than the outer diameter of the pipette tip body but smaller than the diameter of the annular lower edge of the pipette tip head. To store a pipette tip in the rack or flat, the body of the pipette tip is inserted into one of the apertures, and the annular lower edge of the pipette tip engages the upper surface of the rack or flat. The pipette tip then rests within the aperture with the head of the tip extending above the upper surface of the rack or flat and the body of the tip extending below the upper surface.

The industry has developed two primary methods for transporting pipette tips. In the first method, pipette tips are transported using a device which engages a rack or flat in which the pipette tips are held. For example, U.S. Pat. No. 5,324,482 to Scaramella et al. describes a pipette tip packaging system wherein a transfer plate is used to pick up flats of pipette tips by engaging a latching mechanism on the transfer plate with a latching aperture in the pipette tip flat.

A disadvantage of the first method is that it cannot be used to transport pipette tips when they are not stored within a rack or flat. The ability to transport pipette tips apart from racks or flats is desirable in many applications. For example, pipette tips are typically sold packaged in flats, and much existing equipment is designed to process racks, rather than flats, of pipette tips. The first method cannot be used to remove pipette tips from the flat in which they are packaged and set them into a rack for processing, or conversely, to remove pipette tips from the rack after processing and return them to the flat.

In the second method used by the industry to transport pipette tips, the tips are frictionally engaged by a device which then moves the tips. Usually the pipette tips must be force-fit onto some structure to achieve the frictional engagement. This method has typically been used in devices which are primarily designed to draw and expel liquid into and from the pipette tips while they are engaged upon the device. The frictional engagement of the pipette tips is necessary to hold the pipette tips in position while suction is applied to draw the liquid into the pipette tip or suction is released to expel liquid from the pipette tip.

For example, U.S. Pat. No. 5,063,790 to Freeman et al. and U.S. Pat. No. 5,736,105 to Astle each describe an apparatus which comprises one or more structures (nozzles, in Freeman et al., or pin extensions, in Astle) onto each of which a pipette tip may be fitted and sealed. The inner surface of the pipette tip head is frictionally engaged by one or more O-rings fitted upon the structure. While the pipette tips are engaged, each apparatus may be used to carry out a liquid handling task.

The frictional engagement of the pipette tips causes stress to the pipette tips which can distort the shape of the tips or otherwise cause them damage. Further, frictional engagement necessarily requires substantial contact between each pipette tip and the structure to which the pipette tip is attached, increasing the risk that a pipette tip will become contaminated by the apparatus or that the apparatus will become contaminated by the pipette tip.

Further, because these apparatus engage the pipette tips by friction, the apparatus must utilize additional structures to push the pipette tips off of the apparatus. This causes additional wear and tear on the pipette tips. Uneven application of the pressure to release the pipette tips may also cause the pipette tips to become misaligned when pushed off into a supporting structure such as a rack or flat.

Accordingly, the primary object of the present invention is to provide an apparatus which can transport pipette tips independently of racks or flats without frictionally engaging the pipette tips.

Other objects and advantages of the current invention will become apparent when the inventive apparatus for transporting pipette tips is considered in conjunction with the accompanying drawings, specification, and claims.

SUMMARY OF THE INVENTION

An apparatus for transporting pipette tips is provided which comprises a vacuum manifold and one or more air conduits. The pipette tips which the apparatus transports each have a head and a body. The head of each pipette tip has an inner surface and defines a proximal opening at its proximal end. The body of the pipette tip defines a distal opening at its distal end. The proximal opening is larger than the distal opening.

The vacuum manifold internally defines a vacuum chamber, and has a wall which defines one or more apertures. The vacuum manifold is adapted for use in conjunction with a vacuum source.

An air conduit is fixed to each of the one or more apertures defined by the wall of the vacuum manifold. Each air conduit defines an air channel, and is sized such that it can be inserted through the proximal opening of one of the pipette tips without contacting the inner surface of the head of the pipette tip. The air channel of each air conduit is larger than the distal opening of the pipette tip, such that when each air conduit is inserted through the proximal opening of one of the pipette tips and a vacuum source is used in conjunction with the vacuum manifold to create a vacuum in the vacuum chamber, the pipette tips are held in engagement with the vacuum manifold.

DESCRIPTION OF THE PREFERRED EMBODIMENT

Figure 1:
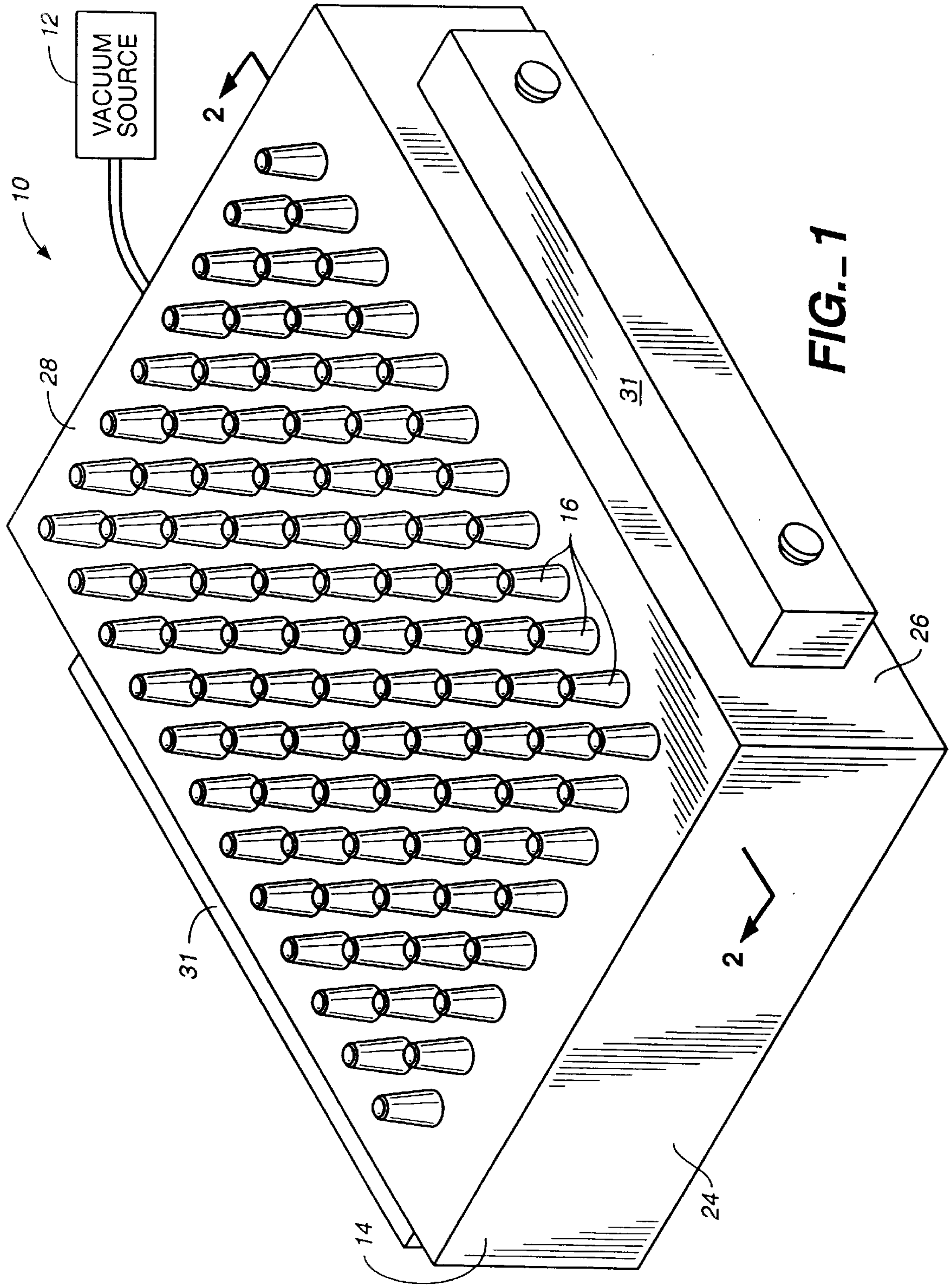
FIG. 1 is a bottom perspective view of the preferred embodiment of inventive apparatus, showing a 12 by 8 array of air conduits fixed to the bottom wall of the vacuum manifold.
Figure 2:
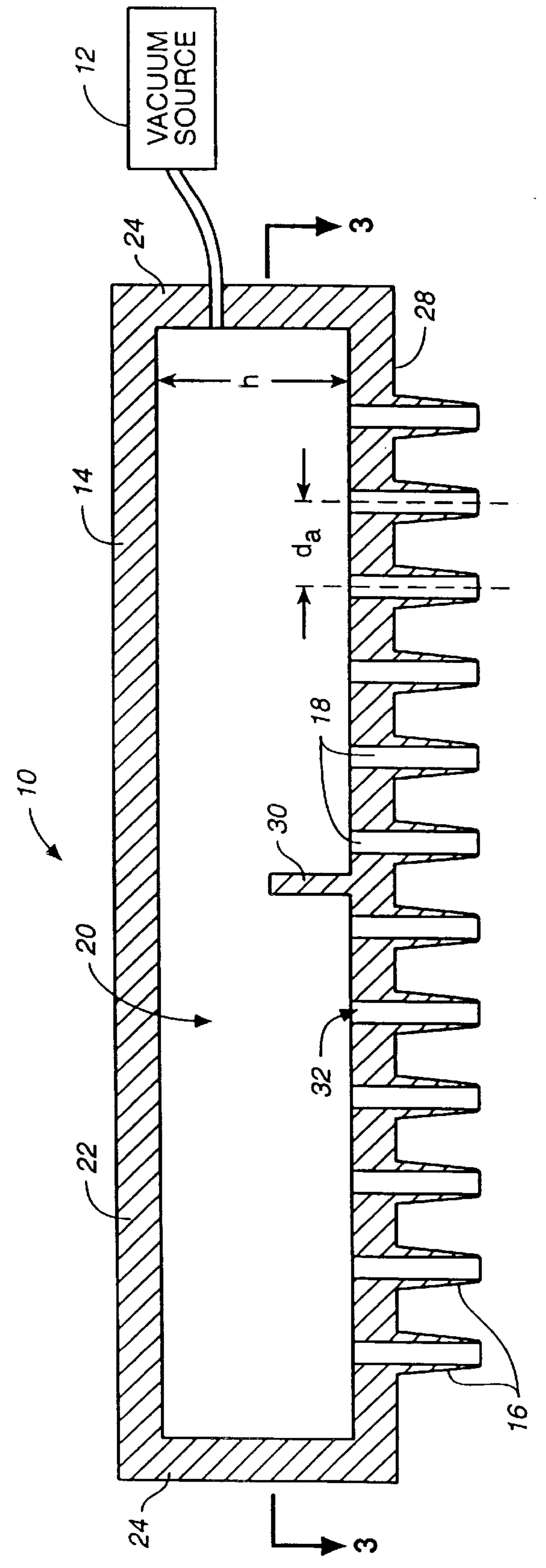
FIG. 2 is a cross sectional view of the preferred embodiment of FIG. 1 taken at section line 2—2, showing the vacuum chamber formed within the vacuum manifold and the cross sections of 12 air conduits.
Figure 3:
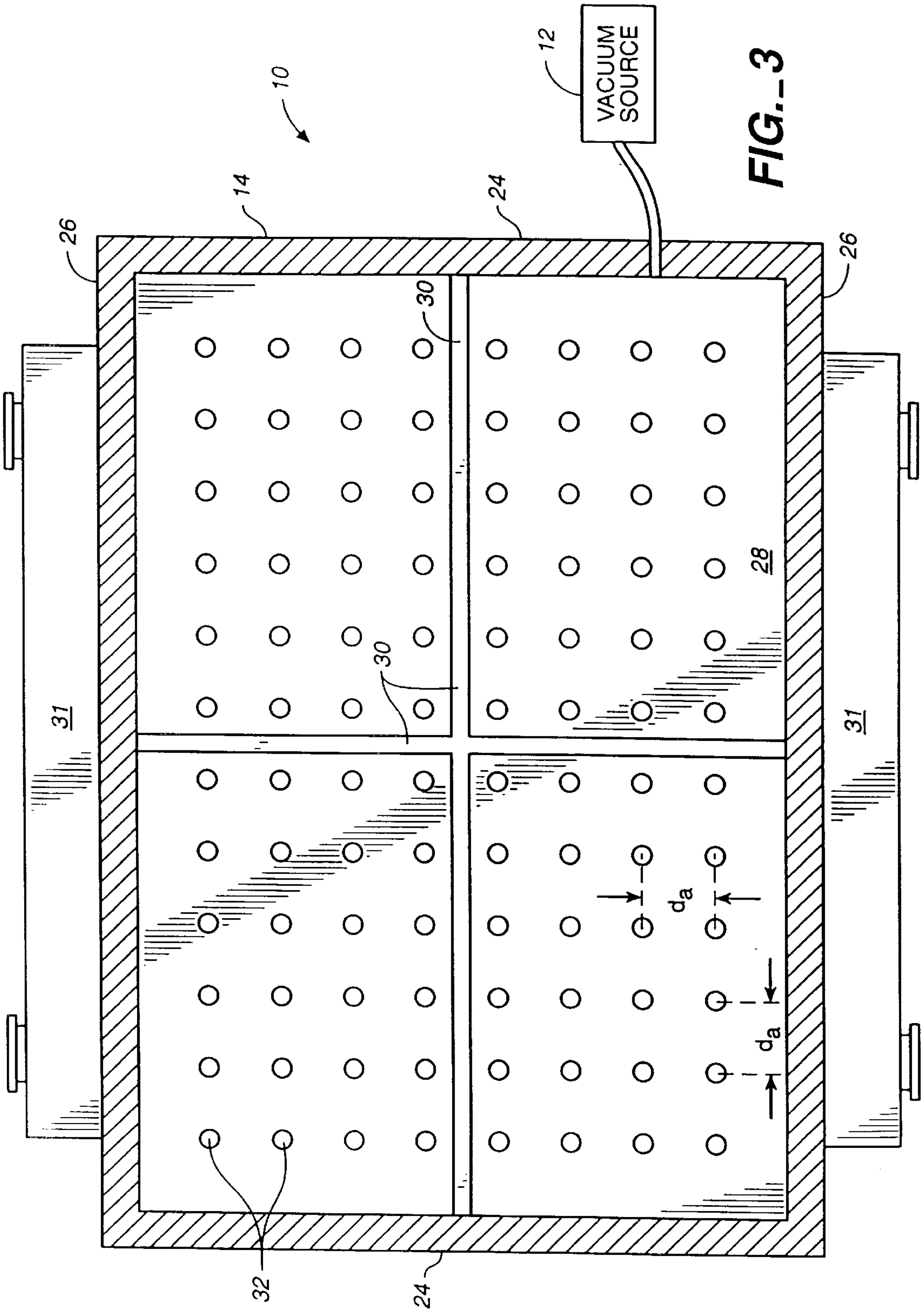
FIG. 3 is a cross sectional view of the preferred embodiment of FIG. 2 taken at section line 3—3.

Referring to FIGS. 1–3, a preferred embodiment of the inventive apparatus for transporting pipette tips is shown. The inventive apparatus comprises a vacuum source 12, a vacuum manifold 14, and one or more air conduits 16. In operation, vacuum manifold 14 is positioned such that each air conduit 16 is inserted into the head of an empty pipette tip. Air conduits 16 are formed such that they may be inserted into the pipette tip heads without contacting the inner surfaces of the pipette tip heads. Vacuum source 12 is then activated, creating a vacuum within vacuum manifold 14.

Each air conduit 16 defines an air channel 18 which is larger than the distal opening in the pipette tip into which the air conduit 16 is inserted. (By using the term "larger," it is meant that the minimum cross sectional area of the air channel 18 is larger than the area of the distal opening.) As the vacuum created in the vacuum manifold pulls air more quickly through the air channels 18 of the air conduits 16 than through the distal openings in the pipette tip bodies, a pressure differential is created between the interior and the exterior of the pipette tip. This air pressure differential is sufficient to counter the relatively light weight of the pipette tip. The pipette tip is thereby pulled into engagement with the bottom wall of the vacuum manifold 14, and, while the vacuum is maintained, the force of the vacuum holds the pipette tips in place against vacuum manifold 14.

The apparatus 10 may then be moved, transporting the pipette tips. When vacuum source 12 is deactivated, the pipette tips are released. As air conduits 16 do not frictionally engage the inner surfaces of the pipette tip heads, gravity will pull the pipette tips away from the inventive apparatus.

In preferred embodiment 10, vacuum manifold 14 forms a vacuum chamber 20 defined by upper wall 22, side walls 24 and 26, and bottom wall 28. Vacuum manifold 14 may be made of metal, or any material which will retain structural integrity upon application of vacuum to vacuum chamber 20. Referring to FIGS. 2 and 3, fins 30 may be formed along bottom wall 28 to provide additional structural support. Preferably, fins 30 extend upwardly through approximately one-half of the height h of vacuum chamber 20. Handles 31 are fixed to side walls 26 of vacuum manifold 14 for convenient handling of the inventive apparatus. For example, a human user may lift and move the inventive apparatus using handles 31; alternatively, handles 31 serve as a convenient location for attachment of the inventive apparatus to an automated system operating the inventive apparatus.

Referring to FIG. 3, bottom wall 28 of vacuum manifold 14 defines an array of apertures 32 which conforms to the industry standard for the configuration of pipette tips in racks or flats. Thus, the apertures 32 are positioned in a 12 by 8 array wherein the distance between the central axes of each two adjacent apertures, designated $d_a$, is approximately 9 millimeters.

Each aperture 32 also serves as the upper opening into an air conduit 16 extending downwardly from bottom wall 28. Each air conduit 16 defines an air channel 18 which connects the vacuum chamber 20 to the atmosphere surrounding apparatus 10. Air conduits 16 may be integral to vacuum manifold 14, or may be separate articles fixed to bottom wall 28 in alignment with apertures 32. similarly, air conduits 16 may be made of any structurally stable and durable material including, but not limited to, metals and plastics.

Figure 7:
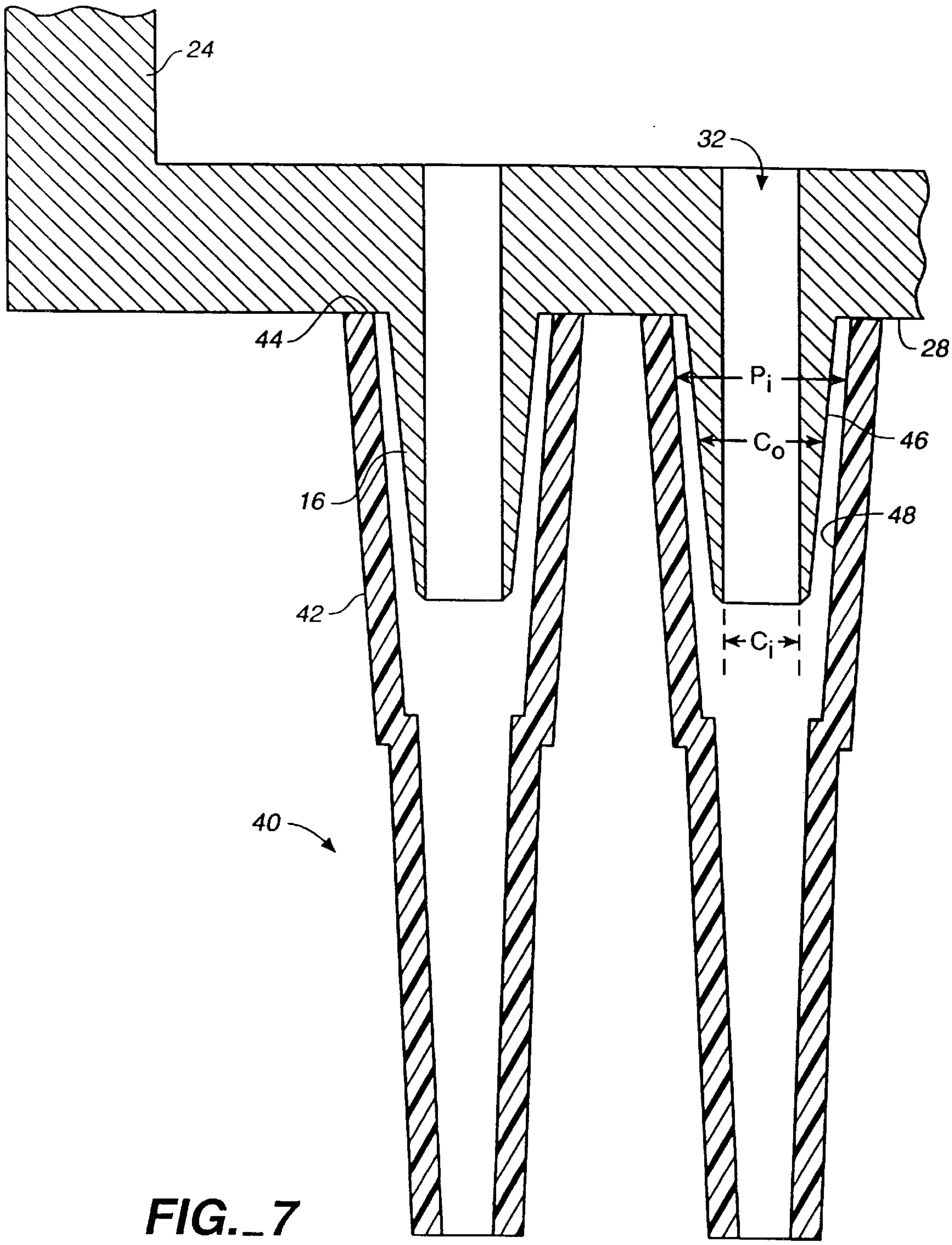
FIG. 7 is an exploded view of two air conduits and pipette tips of FIG. 6.

FIG. 7 shows the preferred size and shape of air conduits 16 with relation to the size and shape of the heads 42 of the pipette tips 40 engaged by the inventive apparatus. When the vacuum source is activated, each pipette tip 40 will be drawn toward vacuum manifold 14 until the upper edge 44 of the head 42 of the pipette tip 40 engages bottom wall 28. The outer surface 46 of each air conduit 16 should be sufficiently narrow that, when the pipette tip 40 engages bottom wall 28, the outer diameter $C_o$ of air conduit 32 is smaller than the inner diameter $P_i$ of the pipette tip head 42 along any horizontal cross section. This allows air conduits 16 to be inserted into pipette tips 40 without any friction, allowing pipette tips 40 to fall freely away from vacuum manifold 14 due to gravity as soon as vacuum source 12 is deactivated. It also allows air conduits 16 to be inserted into pipette tips 40 without contact between the outer surface 46 of the air conduits 16 and the inner surface 48 of the pipette tips, lessening the risks of contamination of the pipette tip from the air conduits 16.

The inner diameter $C_i$ of the air conduits 16 should be optimized such that when vacuum source 12 is activated, sufficient suction is created through air conduits 16 to pull pipette tips 40 towards vacuum manifold 14. Optimization will usually entail maximizing inner diameter $C_i$ to augment the differential between the size of air channel 18 and the distal opening in the pipette body. Increasing this differential increases the force of the suction created by the applied vacuum. The air pressure below pipette tip 40 increases as air is drawn more quickly from the pipette tip through air channel 18 than into the pipette tip through the distal opening.

Vacuum source 12 is attached to vacuum manifold 14 such that it may be activated to create a vacuum within vacuum chamber 20. Vacuum source 12 may be any source capable of creating the vacuum; conceptually, vacuum source 12 can be as simple a device as a tube connected to vacuum manifold 14 to which a user can apply suction by mouth. A preferred vacuum source is a venturi-type vacuum generator which may be bolted to vacuum manifold 14 in position over an aperture (not shown) formed in vacuum manifold 14 (i.e. in upper wall 22). The venturi-type vacuum generator may be purchased from Parker Hannifin Corporation of Wadsworth, Ohio (catalog 1820 Model No. GPN120). As an alternative example, the vacuum source may comprise the central vacuum system of a building and a tube which may be connected to the vacuum manifold 14.

Vacuum source 12 can be connected to vacuum manifold 14 at any point where vacuum source 12 will not interfere with the insertion of air conduits 16 into the pipette tips to be transported. In the preferred embodiment 10, vacuum source 12 is connected to vacuum manifold 14 at its upper wall 22, keeping the structures of vacuum source 12 clear of handles 32. The force of vacuum applied should be sufficient to hold the pipette tips 40 to the vacuum manifold 14, but not so great that the force created buckles or otherwise damages the vacuum manifold 14, the air conduits 16, or the pipette tips 40.

A preferred embodiment of the inventive apparatus has been constructed which has been used to transport pipette tips having an inner diameter at the top of the pipette tip head of 0.2 inches. In this embodiment, the outer diameter of the upper end of each air conduit is 0.18 inches, and the inner diameter of the air conduit at all points is 0.1 inches. The embodiment uses a 12 by 8 array of air conduits separated on the 9 millimeter standard. This embodiment of the inventive apparatus has been used successfully to pick up and transport pipette tips upon the application of an initial vacuum as low as 20 pounds per square inch (PSI). However, it should be understood that the PSI necessary to engage the pipette tips will depend upon a number of factors, including but not limited to the weight of the pipette tip and the relative sizing between air channels 18 and the distal openings in the pipette tips.

Figure 4:
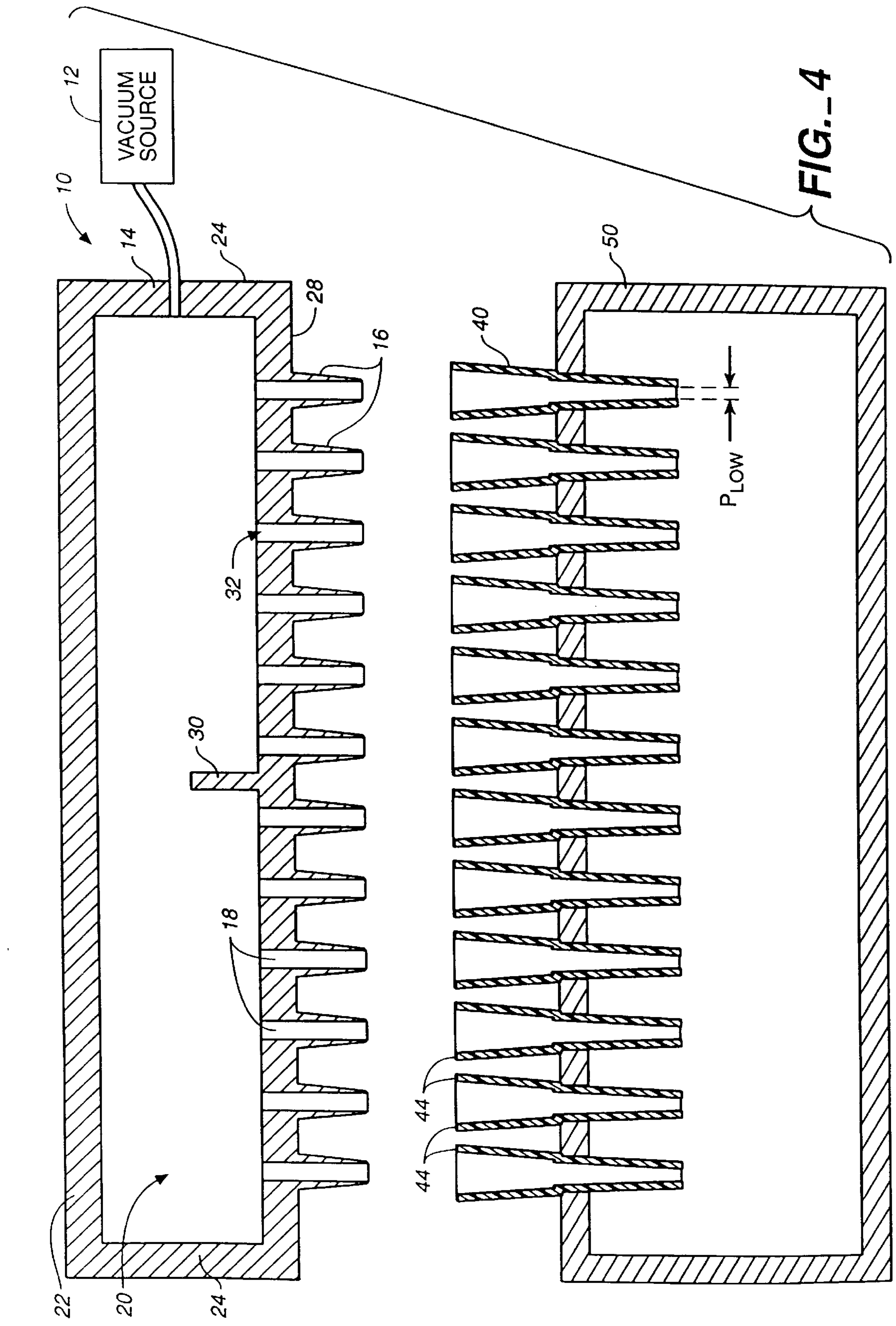
FIG. 4 is a cross sectional view of the inventive apparatus that is positioned over a rack of pipette tips.
Figure 5:
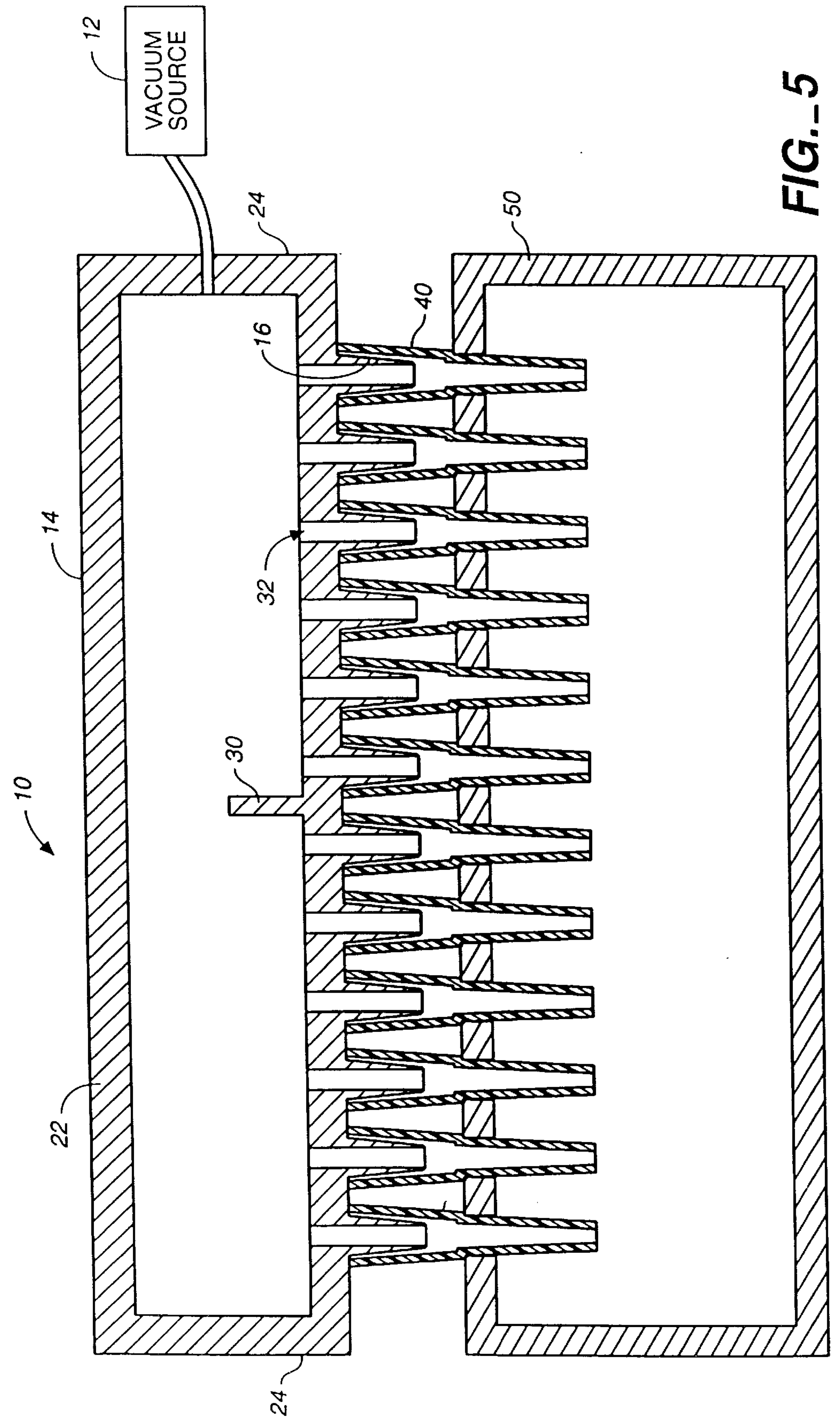
FIG. 5 is a cross sectional view of the inventive apparatus wherein the air conduits of the inventive apparatus have been inserted into the heads of the pipette tips stored in the rack.
Figure 6:
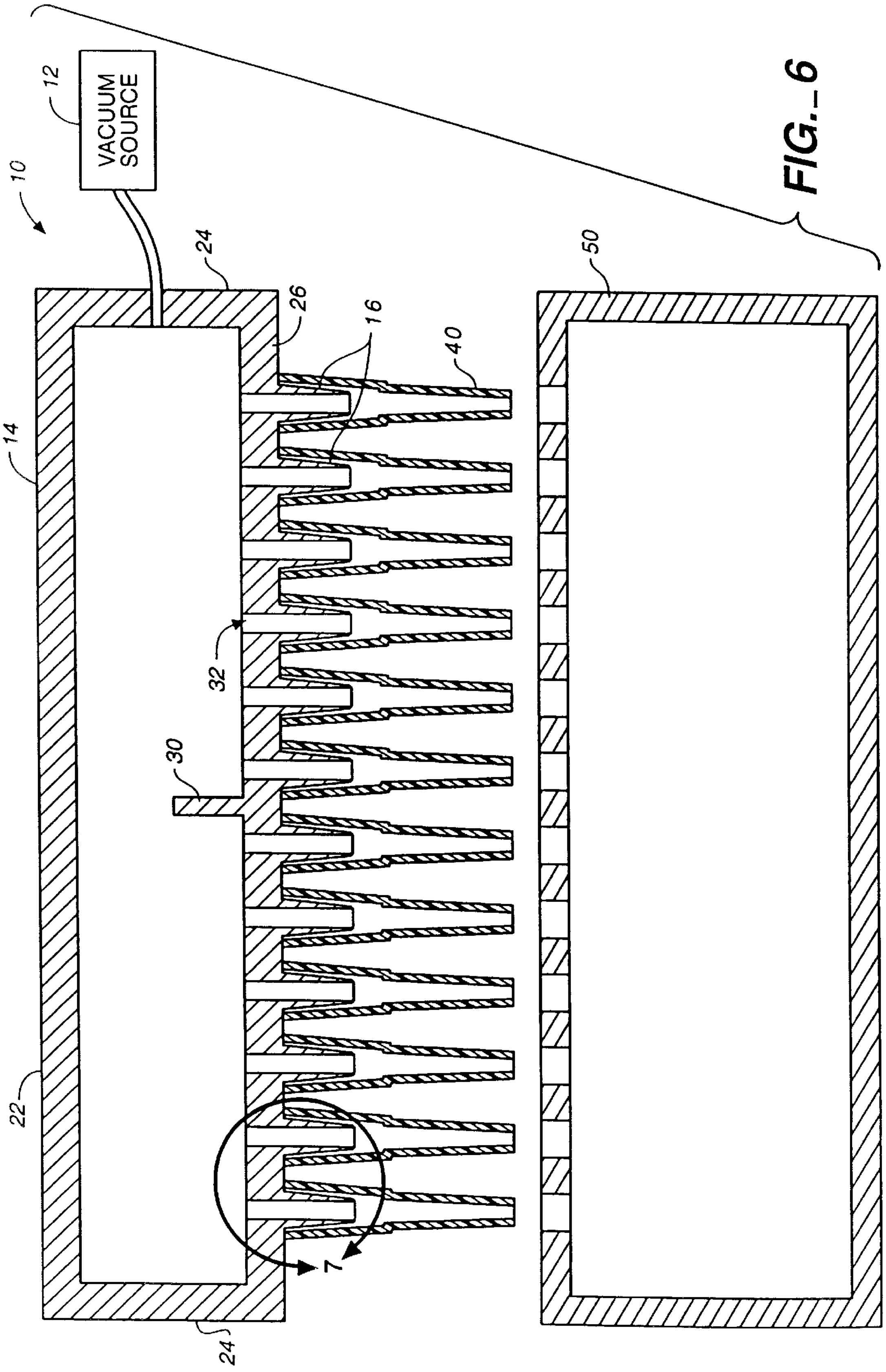
FIG. 6 is a cross sectional view of the inventive apparatus wherein the vacuum source is activated and the pipette tips have been lifted from the rack and are held to the vacuum manifold by vacuum.

FIGS. 4–6 show preferred embodiment 10 in use to remove a set of 96 pipette tips 40 from a standard pipette tip rack 50 holding the pipette tips in a 12 by 8 array. First, referring to FIG. 4, apparatus 10 is positioned vertically over rack 50 such that the 12×8 array of air conduits 16 aligns with the 12×8 array of pipette tips 40. Next, referring to FIG. 5, apparatus 10 is lowered until each air conduit 16 rests within the head of the pipette tip 40 with which it aligns. Vacuum source 12 is then activated, generating a vacuum within vacuum chamber 20 which creates suction through each air channel 18. The suction pulls pipette tips 40 toward bottom wall 28 of vacuum manifold 14, bringing the top edges 44 of pipette tips 40 into engagement with bottom wall 28. As shown in FIG. 6, apparatus 10 may then be lifted away from rack 50, removing pipette tips 40 from rack 42 and holding them to vacuum manifold 14 until vacuum source 12 is deactivated. Before vacuum source 12 is deactivated, apparatus 10 may be positioned to release pipette tips 40 to a desired destination location, such as into a flat, a storage bin, or into another device used to process pipette tips. Once vacuum source 12 is deactivated, no remaining force holds pipette tips 40 to apparatus 10. Accordingly, if the apparatus is positioned such that bottom wall 28 is oriented downwardly, pipette tips 40 will fall downwardly due to gravity.

It should be understood that the inventive apparatus may be used to remove pipette tips stored in non-vertical orientations. For example, if an automated pipettor presents the pipette tips such that the tips are horizontally oriented, the apparatus may be rotated to orient bottom wall 28 vertically, and the vacuum suction provided by the inventive device will pull the pipette tips to vacuum manifold 14.

It should also be understood that the inventive apparatus may use any number and configuration of air conduits 16. For example, while the 12 by 8 array with 9 millimeter separation is useful to process an entire 12 by 8 flat or rack of pipette tips at one time, it may be desired to process only a subset of the flat or rack, such as one row of 12 pipette tips or one column of 8 pipette tips. As additional examples, an inventive apparatus having a single air conduit could be used to individually transport pipette tips, or the inventive apparatus could employ a circular configuration of pipette tips.

The inventive apparatus may also be used in conjunction with other automated pipette tip processing devices. For example, devices currently employing shafts onto which pipette tip heads are engaged by friction can be replaced by an embodiment of the inventive apparatus wherein each shaft is replaced by an air conduit 16; devices utilizing members which engage a pipette tip rack or flat having apertures in which the pipette tips are stored can be replaced by an embodiment of the inventive apparatus wherein an air conduit 16 corresponds to each aperture.

Although the foregoing invention has been described in some detail by way of illustration for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method of transporting at least one pipette tip using a transporting apparatus comprising a vacuum manifold, a vacuum source, and at least one air conduit, each pipette tip having an interior, an exterior, a head defining a first opening into which said at least one air conduit can be inserted without contacting the head of the pipette tip, and a body defining a second opening, said second opening smaller than said first opening, the method comprising:

inserting said at least one air conduit into the first opening defined by the head of said at least one pipette tip;

activating the vacuum source to apply a vacuum to said first opening such that the pressure differential created between said interior and said exterior of said pipette tip draws said at least one pipette tip into engagement with the transporting apparatus;

moving, while maintaining the activation of the vacuum source, the transporting apparatus; and deactivating the vacuum source to release said at least one pipette tip from engagement with the transporting apparatus.

2. The method of claim 1 wherein the head of said at least one pipette tip is conical and the body of said at least one pipette tip is frustoconical.

3. The method of claim 1 wherein said transporting apparatus comprises a plurality of said air conduits formed into a first 12 by 8 array, wherein said transporting apparatus is used to transport a plurality of said pipette tips positioned in a second 12 by 8 array identical to said first 12 by 8 array, and wherein said step of inserting comprises simultaneously inserting each of said air conduits into the head of one of said pipette tips.

* * * * *